(12) United States Patent
Shapiro (10) Patent No.: US 9,874,104 B2
(45) Date of Patent: Jan. 23, 2018

(54) METHOD AND SYSTEM FOR A CERAMIC MATRIX COMPOSITE SHROUD HANGER ASSEMBLY

(71) Applicant: General Electric Company, Schenectady, NY (US)

(72) Inventor: Jason David Shapiro, Methuen, MA (US)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 14/634,060

(22) Filed: Feb. 27, 2015

(65) Prior Publication Data

US 2016/0251982 A1 Sep. 1, 2016

(51) Int. Cl.
*F01D 11/08* (2006.01)
*F01D 25/24* (2006.01)

(52) U.S. Cl.
CPC ............ *F01D 11/08* (2013.01); *F01D 25/246* (2013.01); *F05D 2220/32* (2013.01); *F05D 2240/14* (2013.01); *F05D 2260/15* (2013.01); *F05D 2260/941* (2013.01); *F05D 2300/6033* (2013.01); *Y02T 50/672* (2013.01)

(58) Field of Classification Search
CPC .......... F01D 11/00; F01D 11/08; F01D 25/24; F01D 25/26; F01D 25/246
USPC ............................................... 415/200, 173.1
See application file for complete search history.

(56) References Cited

U.S. PATENT DOCUMENTS

| | | |
|---|---|---|
| 3,583,824 A | 6/1971 | Smuland et al. |
| 3,778,185 A | 12/1973 | Plowman et al. |
| 4,087,199 A * | 5/1978 | Hemsworth ............ F01D 11/08 415/173.3 |
| 4,460,311 A | 7/1984 | Trappmann et al. |
| 4,596,116 A | 6/1986 | Mandet et al. |
| 4,759,687 A | 7/1988 | Miraucourt et al. |
| 4,863,345 A | 9/1989 | Thompson et al. |
| 5,048,288 A | 9/1991 | Bessette et al. |

(Continued)

FOREIGN PATENT DOCUMENTS

| | | |
|---|---|---|
| CA | 2520792 A1 | 3/2006 |
| CN | 1219215 A | 6/1999 |

(Continued)

OTHER PUBLICATIONS

European Search Report and Opinion issued in connection with corresponding EP Application No. 6155655.0 dated Aug. 1, 2016.

(Continued)

*Primary Examiner* — Richard Edgar
(74) *Attorney, Agent, or Firm* — General Electric Company; William Scott Andes (57) ABSTRACT

A shroud and hanger assembly for a gas turbine engine and a method of transferring load from a ceramic matrix composite (CMC) shroud to a CMC shroud hanger assembly are provided. The shroud and hanger assembly includes a shroud hanger assembly formed of a first material having a first coefficient of thermal expansion, the shroud hanger assembly having a forward hanger portion and a separate aftward hanger portion and a shroud formed of a second material having a second coefficient of thermal expansion, the forward and aftward hanger portions configured to couple together to clamp across a forward radially extending wall of the shroud.

18 Claims, 7 Drawing Sheets

(56) References Cited

U.S. PATENT DOCUMENTS

| | | | |
|---|---|---|---|
| 5,074,748 A | 12/1991 | Hagle | |
| 5,080,557 A | 1/1992 | Berger | |
| 5,127,793 A | 7/1992 | Walker et al. | |
| 5,137,421 A | 8/1992 | Hayton | |
| 5,154,577 A | 10/1992 | Kellock et al. | |
| 5,169,287 A | 12/1992 | Proctor et al. | |
| 5,188,507 A | 2/1993 | Sweeney | |
| 5,197,853 A | 3/1993 | Creevy et al. | |
| 5,593,277 A | 1/1997 | Proctor et al. | |
| 5,655,876 A | 8/1997 | Rock et al. | |
| 5,738,490 A | 4/1998 | Pizzi | |
| 5,780,146 A | 7/1998 | Mason et al. | |
| 5,964,575 A | 10/1999 | Marey | |
| 6,113,349 A | 9/2000 | Bagepalli et al. | |
| 6,164,656 A | 12/2000 | Frost | |
| 6,290,459 B1 | 9/2001 | Correia | |
| 6,315,519 B1 | 11/2001 | Bagepalli et al. | |
| 6,340,285 B1 | 1/2002 | Gonyou et al. | |
| 6,402,466 B1 | 6/2002 | Burdgick et al. | |
| 6,412,149 B1 | 7/2002 | Overberg | |
| 6,503,051 B2 | 1/2003 | Predmore | |
| 6,503,574 B1 | 1/2003 | Skelly et al. | |
| 6,699,011 B2 | 3/2004 | Cot et al. | |
| 6,733,233 B2 | 5/2004 | Jasklowski et al. | |
| 6,733,235 B2 | 5/2004 | Alford et al. | |
| 6,808,363 B2 | 10/2004 | Darkins, Jr. et al. | |
| 6,821,085 B2 | 11/2004 | Darkins, Jr. et al. | |
| 6,884,026 B2 * | 4/2005 | Glynn | F01D 11/08 415/113 |
| 6,887,528 B2 | 5/2005 | Lau et al. | |
| 6,893,214 B2 | 5/2005 | Alford et al. | |
| 6,942,203 B2 | 9/2005 | Schroder et al. | |
| 7,011,493 B2 | 3/2006 | Marchi et al. | |
| 7,052,235 B2 | 5/2006 | Alford et al. | |
| 7,217,089 B2 | 5/2007 | Durocher et al. | |
| 7,238,002 B2 | 7/2007 | Cairo et al. | |
| 7,270,518 B2 | 9/2007 | Barb et al. | |
| 7,278,820 B2 | 10/2007 | Keller | |
| 7,556,475 B2 | 7/2009 | Roberts, III et al. | |
| 7,563,071 B2 | 7/2009 | Campbell et al. | |
| 7,595,114 B2 | 9/2009 | Meschter et al. | |
| 7,686,577 B2 | 3/2010 | Morrison et al. | |
| 7,726,936 B2 | 6/2010 | Keller et al. | |
| 7,749,565 B2 | 7/2010 | Johnson et al. | |
| 7,753,643 B2 | 7/2010 | Gonzalez et al. | |
| 7,819,625 B2 | 10/2010 | Merrill et al. | |
| 7,871,244 B2 | 1/2011 | Marini et al. | |
| 7,908,867 B2 | 3/2011 | Keller et al. | |
| 7,950,234 B2 | 5/2011 | Radonovich et al. | |
| 7,968,217 B2 | 6/2011 | Sarrafi-Nour et al. | |
| 8,047,773 B2 | 11/2011 | Bruce et al. | |
| 8,079,807 B2 | 12/2011 | Shapiro et al. | |
| 8,118,546 B2 | 2/2012 | Morrison | |
| 8,128,350 B2 | 3/2012 | Schiavo et al. | |
| 8,167,546 B2 | 5/2012 | Shi et al. | |
| 8,246,299 B2 | 8/2012 | Razzell et al. | |
| 8,303,245 B2 | 11/2012 | Foster et al. | |
| 8,303,247 B2 | 11/2012 | Schlichting et al. | |
| 8,328,505 B2 | 12/2012 | Shi et al. | |
| 8,511,975 B2 | 8/2013 | Shi et al. | |
| 8,834,106 B2 | 9/2014 | Luczak | |
| 2002/0127108 A1 | 9/2002 | Crall et al. | |
| 2003/0031557 A1 | 2/2003 | Arilla et al. | |
| 2003/0133790 A1 | 7/2003 | Darkins, Jr. et al. | |
| 2003/0215328 A1 | 11/2003 | McGrath et al. | |
| 2004/0005216 A1 | 1/2004 | Suzumura et al. | |
| 2004/0005452 A1 | 1/2004 | Dorfman et al. | |
| 2004/0047726 A1 | 3/2004 | Morrison | |
| 2004/0219011 A1 | 11/2004 | Albers et al. | |
| 2005/0003172 A1 | 1/2005 | Wheeler et al. | |
| 2005/0111965 A1 | 5/2005 | Lowe et al. | |
| 2005/0129499 A1 | 6/2005 | Morris et al. | |
| 2005/0141989 A1 | 6/2005 | Sayegh et al. | |
| 2006/0078429 A1 | 4/2006 | Darkins, Jr. et al. | |
| 2006/0083607 A1 | 4/2006 | Synnott et al. | |
| 2006/0110247 A1 | 5/2006 | Nelson et al. | |
| 2006/0110248 A1 | 5/2006 | Nelson et al. | |
| 2006/0292001 A1 | 12/2006 | Keller et al. | |
| 2007/0031245 A1 | 2/2007 | Ruthemeyer et al. | |
| 2007/0154307 A1 | 7/2007 | Cairo | |
| 2008/0025838 A1 | 1/2008 | Marini et al. | |
| 2008/0206542 A1 | 8/2008 | Vance et al. | |
| 2009/0010755 A1 | 1/2009 | Keller et al. | |
| 2009/0053045 A1 | 2/2009 | Nowak et al. | |
| 2009/0208322 A1 | 8/2009 | McCaffrey | |
| 2009/0324393 A1 | 12/2009 | Gonzalez et al. | |
| 2011/0182720 A1 | 7/2011 | Kojima et al. | |
| 2011/0274538 A1 | 11/2011 | Shi et al. | |
| 2011/0293410 A1 | 12/2011 | Marusko et al. | |
| 2011/0299976 A1 | 12/2011 | Uskert | |
| 2011/0318171 A1 | 12/2011 | Albers et al. | |
| 2012/0082540 A1 | 4/2012 | Dziech et al. | |
| 2012/0107122 A1 | 5/2012 | Albers et al. | |
| 2012/0156029 A1 | 6/2012 | Karafillis et al. | |
| 2012/0171023 A1 | 7/2012 | Albers et al. | |
| 2012/0171027 A1 | 7/2012 | Albers et al. | |
| 2012/0247124 A1 | 10/2012 | Shapiro et al. | |
| 2012/0260670 A1 | 10/2012 | Foster et al. | |
| 2012/0263582 A1 | 10/2012 | Foster et al. | |
| 2012/0275898 A1 | 11/2012 | McCaffrey et al. | |
| 2013/0000324 A1 | 1/2013 | Alvanos et al. | |
| 2013/0004306 A1 | 1/2013 | Albers et al. | |
| 2013/0011248 A1 | 1/2013 | Croteau et al. | |
| 2013/0017057 A1 | 1/2013 | Lagueux | |
| 2013/0156550 A1 | 6/2013 | Franks et al. | |
| 2013/0156556 A1 | 6/2013 | Franks et al. | |
| 2013/0266435 A1 | 10/2013 | Foster et al. | |
| 2014/0255170 A1 | 9/2014 | Hillier | |
| 2014/0271144 A1 | 9/2014 | Landwehr et al. | |
| 2014/0271145 A1 | 9/2014 | Thomas et al. | |
| 2014/0294571 A1 | 10/2014 | Hillier | |
| 2014/0294572 A1 | 10/2014 | Hillier et al. | |
| 2014/0308113 A1 | 10/2014 | Westphal et al. | |
| 2015/0016970 A1 | 1/2015 | Smith et al. | |
| 2015/0377035 A1 * | 12/2015 | Freeman | F01D 11/12 416/191 |

FOREIGN PATENT DOCUMENTS

| | | |
|---|---|---|
| CN | 1542259 A | 11/2004 |
| CN | 102135020 A | 7/2011 |
| EP | 0770761 A1 | 5/1997 |
| EP | 1225309 A1 | 7/2002 |
| EP | 1548144 A1 | 6/2005 |
| EP | 1801361 A1 | 6/2007 |
| EP | 2631434 A2 | 8/2013 |
| EP | 2774905 A1 | 9/2014 |
| FR | 2540938 A1 | 8/1984 |
| FR | 2580033 A1 | 10/1986 |
| FR | 2942844 A1 | 9/2010 |
| GB | 2397102 A | 7/2004 |
| JP | 5710710 A | 1/1982 |
| JP | 63239301 A | 10/1988 |
| JP | 05141270 A | 6/1993 |
| JP | 0913904 A | 1/1997 |
| JP | 10103014 A | 4/1998 |
| JP | 2002276301 A | 9/2002 |
| JP | 2004036443 A | 2/2004 |
| JP | 2005155626 A | 6/2005 |
| JP | 2006105393 A | 4/2006 |
| JP | 2007046603 A | 2/2007 |
| JP | 2007182881 A | 7/2007 |
| JP | 2013170578 A | 9/2013 |
| WO | 02099254 A1 | 12/2002 |
| WO | 03026886 A2 | 4/2003 |
| WO | 2013163505 A1 | 10/2013 |

(56) References Cited

FOREIGN PATENT DOCUMENTS

WO  2014130762 A1  8/2014
WO  2014186099 A1  11/2014

OTHER PUBLICATIONS

A PCT Search Report and Written Opinion issued in connection with related PCT Application No. PCT/US2014/035089 dated Jul. 1, 2014.
A U.S. Non-Final Office Action issued in connection with related U.S. Appl. No. 13/327,349 dated Jul. 22, 2014.
A U.S. Non-Final Office Action issued in connection with related U.S. Appl. No. 13/402,616 dated Jul. 24, 2014.
A U.S. Non-Final Office Action issued in connection with related U.S. Appl. No. 13/327,349 dated Jan. 27, 2015.
A PCT Search Report and Written Opinion issued in connection with related PCT Application No. PCT/US2014/068490 dated Mar. 5, 2015.
A Chinese office action issued in connection with related CN Application No. 201210541477.1 dated May 12, 2015.
A Chinese office action issued in connection with related CN Application No. 201310056712.0 dated Jun. 19, 2015.
A European Search Report and opinion issued in connection with related EP Application No. 12195953.0 dated Jul. 22, 2015.
A Chinese Office Action issued in connection with related CN Application No. 201480028735.3 dated Sep. 5, 2016.
A Japanese Office Action issued in connection with related JP Application No. 2012269895 dated Oct. 4, 2016.
A Japanese Office Action issued in connection with related JP Application No. 2013027200 dated Oct. 18, 2016.
A Chinese office action issued in connection with related CN Application No. 201480067368.8 dated Nov. 2, 2016.
A Japanese Office Action issued in connection with related JP Application No. 2016513961 dated Nov. 8, 2016.
A Japanese Notice of Allowance issued in connection with related JP Application No. 2013027200 dated Nov. 29, 2016.
A Japanese Search Report issued in connection with Corresponding JP Application No. 2016029448 dated Jan. 25, 2017.
A Japanese Notice of Allowance issued in connection with related JP Application No. 2016513961 dated Feb. 21, 2017.
A Japanese Search Report issued in connection with related JP Application No. 2012269895 dated Mar. 21, 2017.
A PCT Search Report and Written Opinion issued in connection with related PCT Application No. PCT/US2015/027247 dated Jul. 10, 2015.
A PCT Search Report and Written Opinion issued in connection with related PCT Application No. PCT/US2015/029236 dated Jul. 20, 2015.
A PCT Search Report and Written Opinion issued in connection with related PCT Application No. PCT/US2015/029342 dated Jul. 22, 2015.
A PCT Search Report and Written Opinion issued in connection with related PCT Application No. PCT/US2015/028050 dated Aug. 11, 2015.
U.S. Appl. No. 62/011,237, filed Jun. 12, 2014, entitled Shroud Hanger Assembly.

* cited by examiner

METHOD AND SYSTEM FOR A CERAMIC MATRIX COMPOSITE SHROUD HANGER ASSEMBLY

BACKGROUND

This description relates to a composite shroud hanger assembly, and, more particularly, to a method and system for a two-piece ceramic matrix composite (CMC) shroud hanger assembly which clamps across a forward vertical wall of a shroud to support the shroud while transferring turbine nozzle load through the shroud hanger assembly and into a gas turbine engine casing.

At least some known gas turbine engines include a core having a high pressure compressor, combustor, and high pressure turbine (HPT) in serial flow relationship. The core engine is operable to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and may be cooled by air flow to ensure adequate service life.

Components of the gas turbine engine, for example stationary shrouds or shroud segments and their supporting structures, such as, shroud hanger assemblies, are exposed to a heated stream of combustion gases. It is desirable to operate a gas turbine engine at high temperatures most efficient for generating and extracting energy from these gases. However, such elevated temperatures frequently exceed the temperature capability of the basic component materials and can result in compromise of mechanical and/or physical properties, or distortion of the components. Consequently, use has been made of various heat-resistant coatings and/or cooling processes. If cooling is used, is it usually implemented by channeling relatively cooler air, for example from various points in the high-pressure compressor of the engine, and discharging it within or from a component to provide convection, impingement, or film cooling.

In other examples, due to operating temperatures within the gas turbine engine, materials having a low coefficient of thermal expansion (CTE) are used. For example, to operate effectively in such adverse temperature and pressure conditions, ceramic matrix composite (CMC) materials may be used. These low coefficient of thermal expansion materials have higher temperature capability than similar metallic parts, so that, when operating at the higher operating temperatures, the engine is able to operate at a higher engine efficiency. However, such ceramic matrix composite (CMC) have mechanical properties that must be considered during the design and application of the CMC. CMC materials have relatively low tensile ductility or low strain to failure when compared to metallic materials. Also, CMC materials have a coefficient of thermal expansion which differs significantly from metal alloys used as restraining supports or hangers for CMC type materials. Therefore, if a CMC component is restrained and cooled on one surface during operation, stress concentrations can develop leading to a shortened life of the segment.

At least some known gas turbine engine are manufactured using a CMC "open shroud" configuration, which may be preferred for manufacturing over other types of segmented CMC shrouds, such as a "box shroud". Complex hanger assemblies have been required, however to transfer a load from, for example, a nozzle of a turbine through the shroud hanger assembly without damaging the shroud. Because of the configuration, some portions of the CMC components are not always in compression. CMC material can withstand compression loads, but experiences a reduced life when subject to tensile or moment loads.

Other hanger designs have used a flexible spring-arm at the forward or aft side of the hanger and a ridged arm at opposite side to provide a light clamp load across the entire shroud for sealing. At the same time, additional engine components or more complex hanger designs were used to transfer the nozzle load around the shroud and through the hanger and into the turbine casing.

BRIEF DESCRIPTION

In one embodiment, a shroud and hanger assembly for a gas turbine engine includes a shroud hanger assembly formed of a first material having a first coefficient of thermal expansion, the shroud hanger assembly having a forward hanger portion and a separate aftward hanger portion and a shroud formed of a second material having a second coefficient of thermal expansion, the forward and aftward hanger portions configured to couple together to clamp across a forward radially extending wall of the shroud.

In another embodiment, a method of transferring load from a ceramic matrix composite (CMC) shroud to a CMC shroud hanger assembly includes clamping a forward hanger portion and a separate aftward hanger portion of a shroud hanger assembly together, a forward radially extending wall of the shroud positioned between the forward hanger portion and the aftward hanger portion, the forward radially extending wall receiving a clamping force on a forward side from the forward hanger portion and on an aftward side from the aftward hanger portion providing a load transfer joint between the shroud and the shroud hanger assembly. The method further includes coupling the shroud hanger assembly to a casing of a turbine and transferring load from a nozzle through a diagonal web member of the shroud hanger assembly to the casing.

In yet another embodiment, a gas turbine engine includes a shroud hanger assembly formed of a first material having a first coefficient of thermal expansion, the shroud hanger assembly having a forward hanger portion and a separate aftward hanger portion and a shroud formed of a second material having a second coefficient of thermal expansion, the forward and aftward hanger portions configured to couple together to clamp across a forward radially extending wall of the shroud.

BRIEF DESCRIPTION OF THE DRAWINGS

FIGS. 1-7 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

Embodiments of this disclosure describe a two-piece CMC shroud hanger assembly, which clamps across a forward vertical wall of a shroud to support the shroud while transferring turbine nozzle load through the hanger and into a casing of a turbine. Such a support method maintains the CMC material of the shroud hanger assembly in compression, a direction in which it has high strength, and allows the nozzle load to be transferred through the shroud instead of around it.

A forward hanger is bolted to an aft hanger proximate a radially outer diameter of the hangers. A shroud formed of a material having a relatively low coefficient of thermal expansion, such as, but, not limited to a ceramic matrix composite (CMC) material is clamped between the forward and aft hanger sections at a radially inner diameter of the hangers. This clamp allows loads from the HPT nozzle to be transferred into the forward hanger, and across a load transfer joint between the shroud and the shroud hanger assembly while allowing the CMC shroud to remain in compression. This clamp also serves to seal the shroud post-impingement cavity leakage at the forward end of the shroud. At the aft end of the shroud this leakage flow is sealed via two conformal seals, for example, but not limited to M-seals.

The CMC shroud is radially supported by one or more pins, which pass axially through both the shroud and the aft hanger. The pins are slightly loose in the shroud, and press fit into the hanger. The inner most conformal seal is present to block any flow leakage through the shroud aft pin holes.

The following detailed description illustrates embodiments of the disclosure by way of example and not by way of limitation. It is contemplated that the disclosure has general application to analytical and methodical embodiments of transmitting loads from one component to another.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear of the engine.

As used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The following description refers to the accompanying drawings, in which, in the absence of a contrary representation, the same numbers in different drawings represent similar elements.

Figure 1:
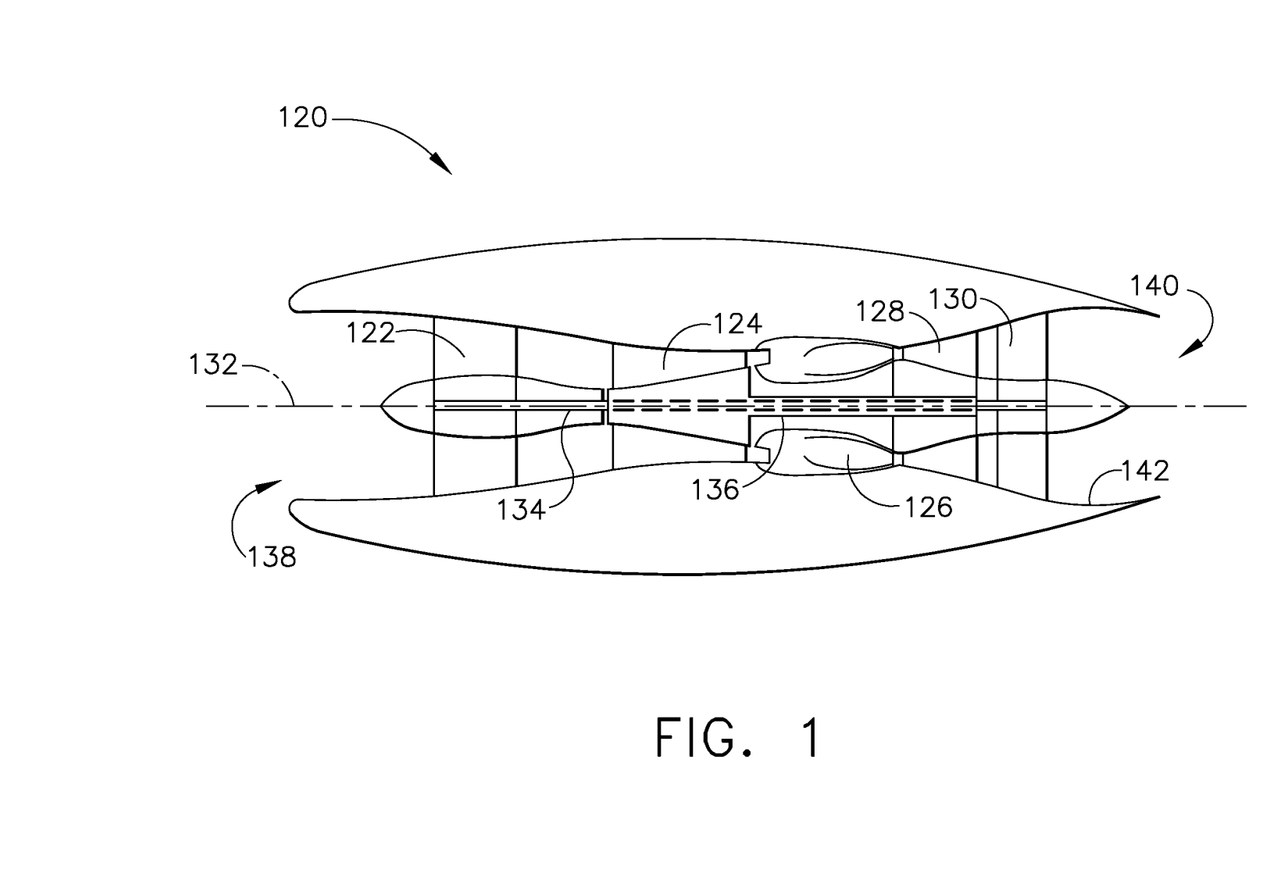
FIG. 1 is a schematic diagram of a gas turbine engine in accordance with an example embodiment of the present disclosure.

FIG. 1 is a schematic diagram of a gas turbine engine 120 including a fan 122, a high pressure compressor 124, and a combustor 126. Engine 120 also includes a high pressure turbine 128 and a low pressure turbine 130 aligned coaxially about a longitudinal axis 132 of gas turbine engine 120. Fan 122 and turbine 130 are coupled by a first shaft 134, and high pressure compressor 124 and turbine 128 are coupled by a second shaft 136. In one embodiment, engine 120 is an F414 engine commercially available from GE Aircraft Engines, Evendale, Ohio.

In operation, air received through an inlet end 138 of engine 120 is compressed by fan 122 and channeled to high pressure compressor 124, where the compressed air is compressed even further. The highly compressed air from high pressure compressor 124 is channeled to combustor 126, Wherein it is mixed with a fuel and ignited to produce combustion gases. The combustion gases are channeled from combustor 126 to drive turbines 128 and 130, and exit an outlet end 140 of engine 120 through an exhaust nozzle assembly 142 to provide thrust.

Figure 2:
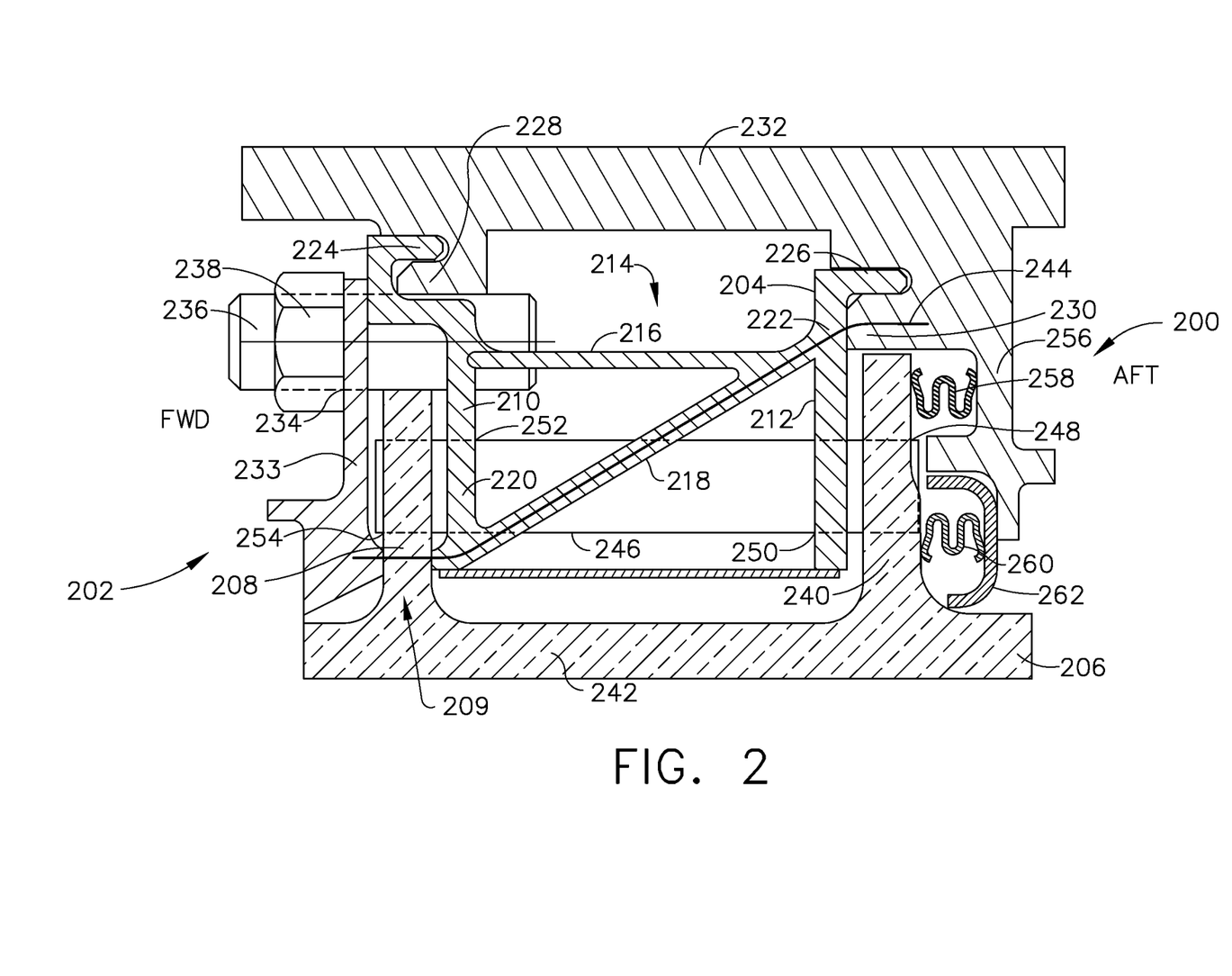
FIG. 2 is a side view of a shroud hanger assembly in accordance with an example embodiment of the present disclosure.
Figure 3:
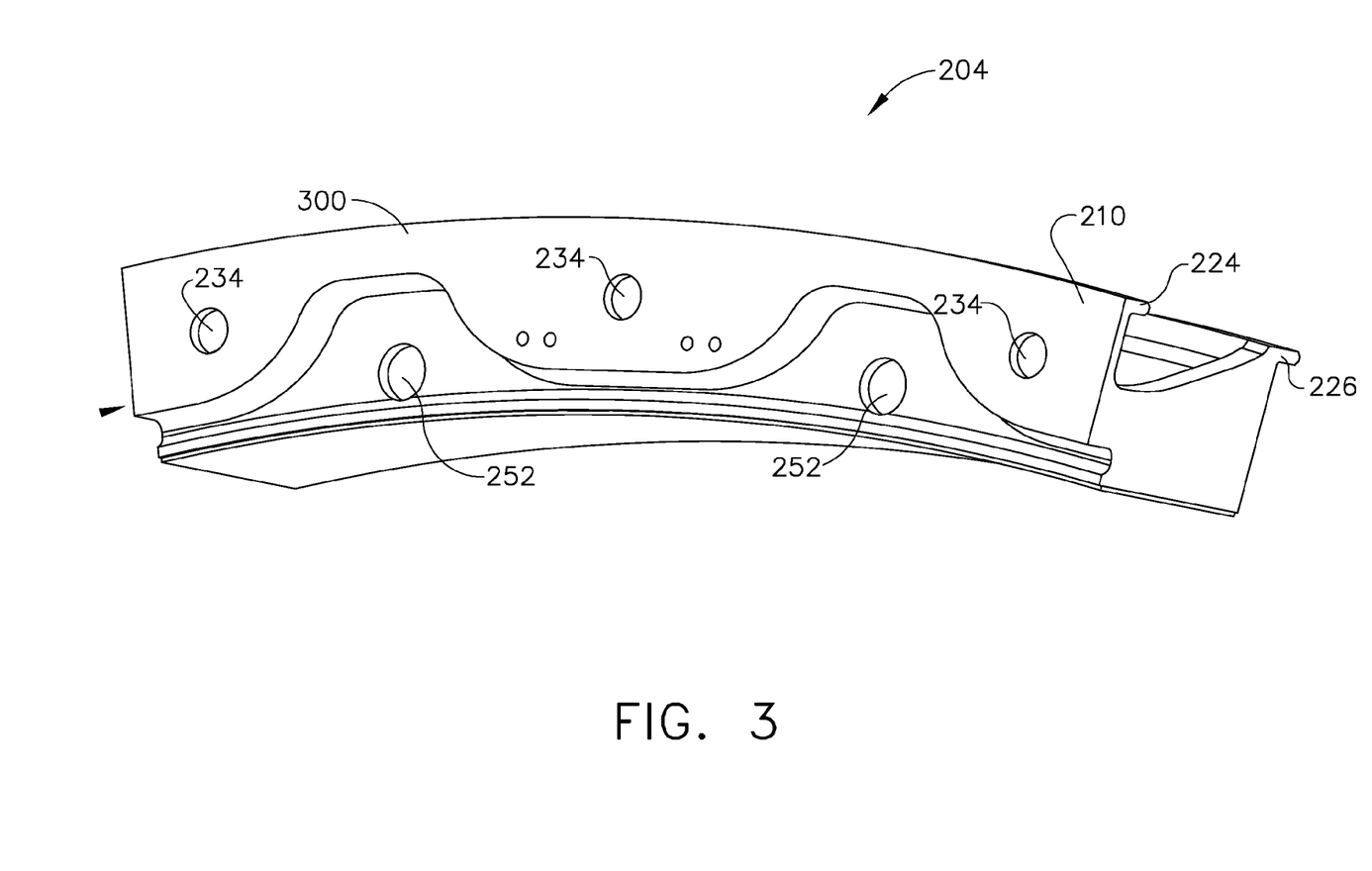
FIG. 3 is a perspective view of a segment of the aftward hanger portion shown in FIG. 2.
Figure 4:
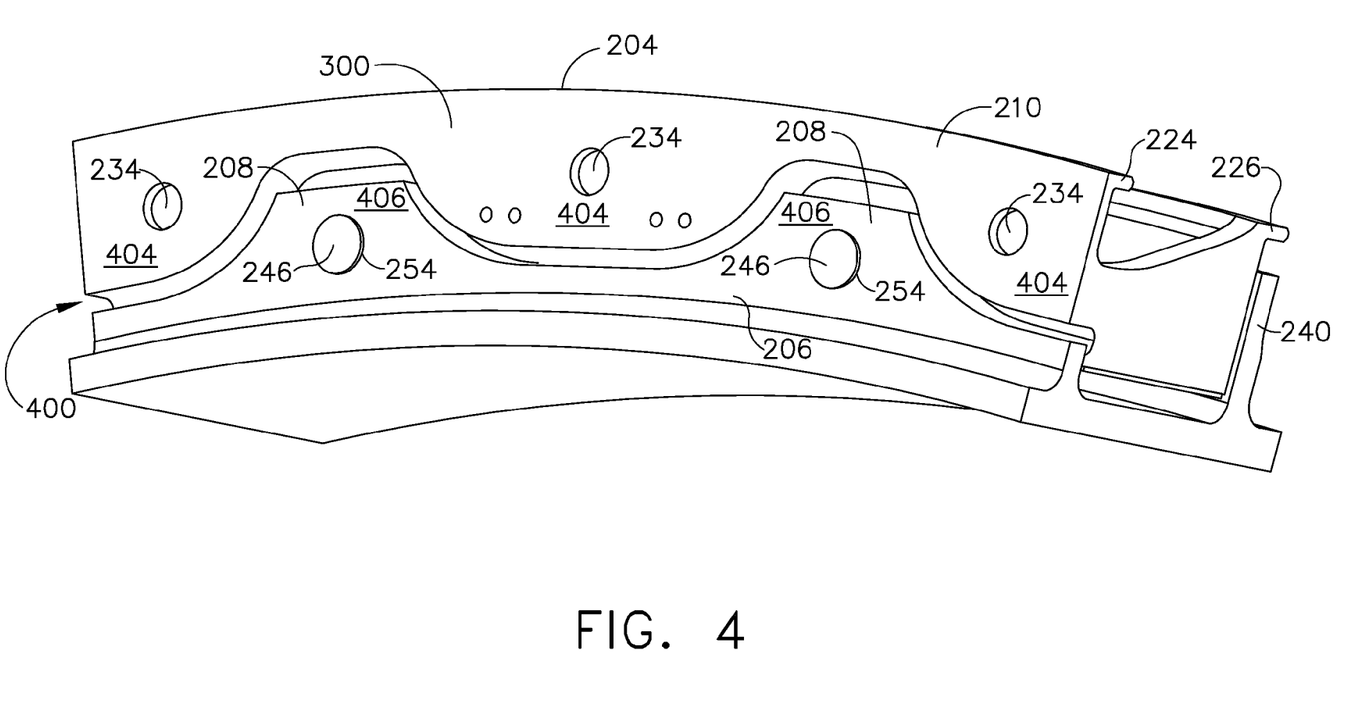
FIG. 4 is a forward perspective view looking aft of the segment shown in FIG. 3 coupled to the shroud shown in FIG. 2.

FIG. 2 is a side view of a shroud hanger assembly 200 in accordance with an example embodiment of the present disclosure. FIG. 3 is a perspective view of a segment 300 of the aftward hanger portion 204 (shown in FIG. 2). FIG. 4 is a forward perspective view looking aft of segment 300 (shown in FIG. 3) coupled to shroud 206 (shown in FIG. 2). One or more of the segments 300 extend circumferentially about axis 132 (shown in FIG. 1). In the example embodiment, shroud hanger assembly 200 may be located within high pressure turbine 128 and/or low pressure turbine 130 (shown in FIG. 1) between or adjacent to rows of nozzles (not shown). Shroud hanger assembly 200 is formed of a first metallic material having a relatively higher coefficient of thermal expansion and includes a forward hanger portion 202 and separate aftward hanger portion 204. Shroud hanger assembly 200 also includes a shroud 206 formed of a second material having a relatively lower coefficient of thermal expansion compared to the first material. Forward hanger portion 202 and aftward hanger portion 204 are configured to couple together to clamp across a forward radially extending wall 208 of shroud 206 at a load transfer joint 209 between forward hanger portion 202 and aftward hanger portion 204.

Aftward hanger portion 204 includes a first forward radially extending leg 210 and a second aftward radially extending leg 212. Aftward hanger portion 204 also includes one or more web members 214 extending between first leg 210 and second leg 212. Specifically, in the example embodiment, web members 214 include an axially extending web member 216 and a diagonal web member 218 that extends from a radially inner end 220 of leg 210 to a radially outer end 222 of leg 212. At a radially outer extent of each of legs 210 and 212, respective hanger tabs 224 and 226 are configured to engage respective lips 228 and 230 in a turbine casing 232. Between aftward radially extending wall 240 and a radially inwardly extending leg 256 of turbine casing 232, leakage flow is sealed using two conformal seals 258 and 260, for example, but not limited to M-seals. In various embodiments, seals 260 is backed-up by a second seal 262, for example, but, not limited to, a C-seal.

Forward hanger portion 202 includes a radially extending body 233 that includes one or more apertures 234 configured to receive a respective fastener 236, such as a bolt 236 secured by a nut 238. In various embodiments, other mechanical fasteners 236 are used.

Shroud 206 is formed of CMC and includes forward radially extending wall 208, an aftward radially extending wall 240, and a body 242 extending axially therebetween. When fully assembled, forward wall 208 is clamped between forward hanger portion 202 and first forward radially extending leg 210 of aftward hanger portion 204. Bolt 236 secures forward hanger portion 202 and aftward hanger portion 204 together providing a predetermined clamping force. A load 244 transmitted from shroud 206 into hanger assembly 200 is carried through diagonal web member 218, hanger tab 226, and lip 230 to turbine casing 232.

Radial support for shroud 206 is also provided by a pin 246 extending through an aperture 248 in aftward radially extending wall 240, an aperture 250 in leg 212, an aperture 252 in leg 210, and an aperture 254 in forward radially extending wall 208 of shroud 206.

In the example embodiment, as illustrated in FIGS. 3 and 4, first forward radially extending leg 210 of aftward hanger portion 204 and forward radially extending wall 208 of shroud 206 include complementary tabs 402 spaced circumferentially about leg 210 and wall 208. Specifically, leg 210 includes tabs 404 and wall 208 includes tabs 406 extending radially outwardly between radially outwardly extending tabs 404. In this manner, tabs 404 and tabs 406 are interdigitated with respect to each other about a circumference of aftward hanger portion 204 and shroud 206.

Figure 5:
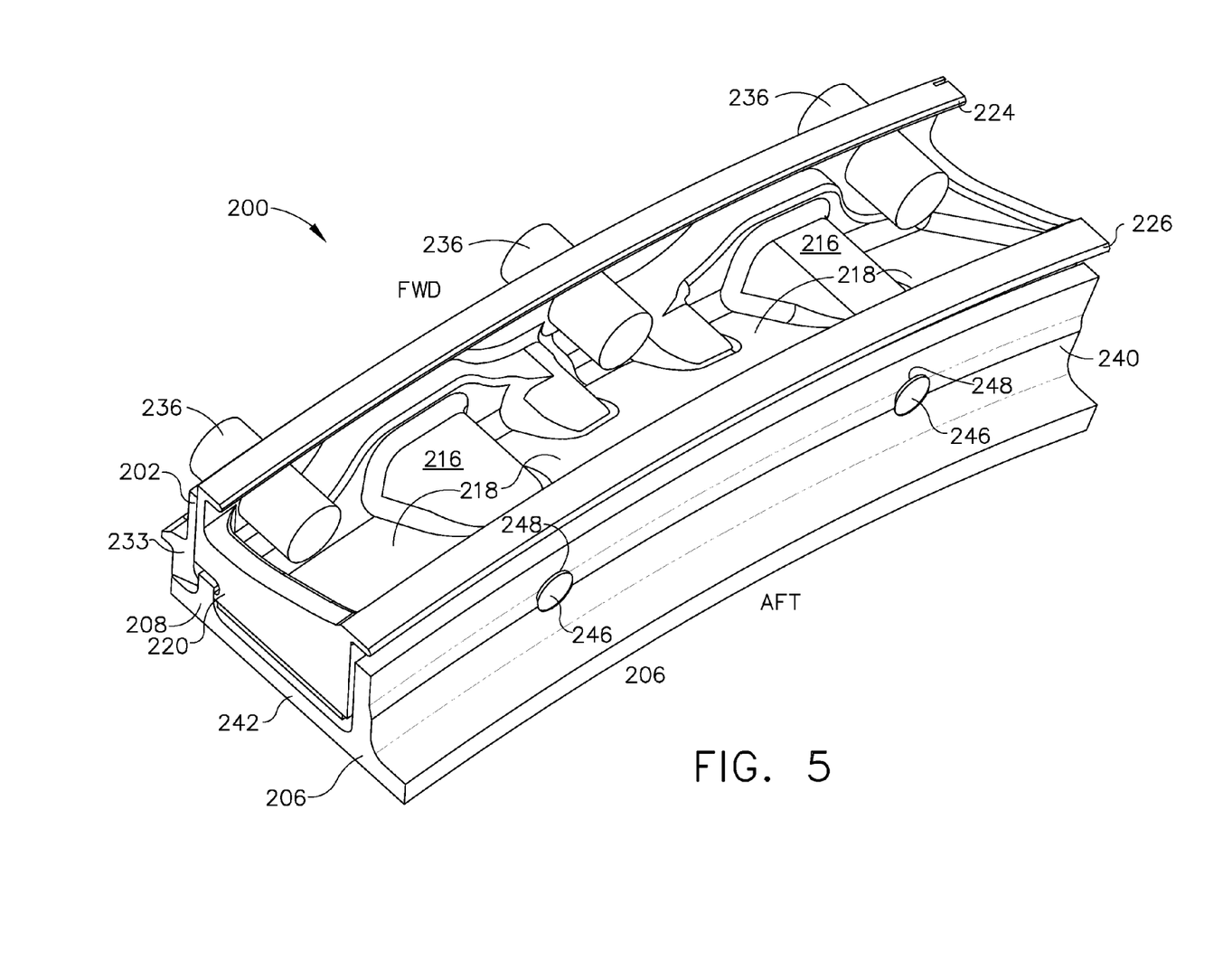
FIG. 5 is an aft perspective view of the shroud hanger assembly looking forward from above.
Figure 6:
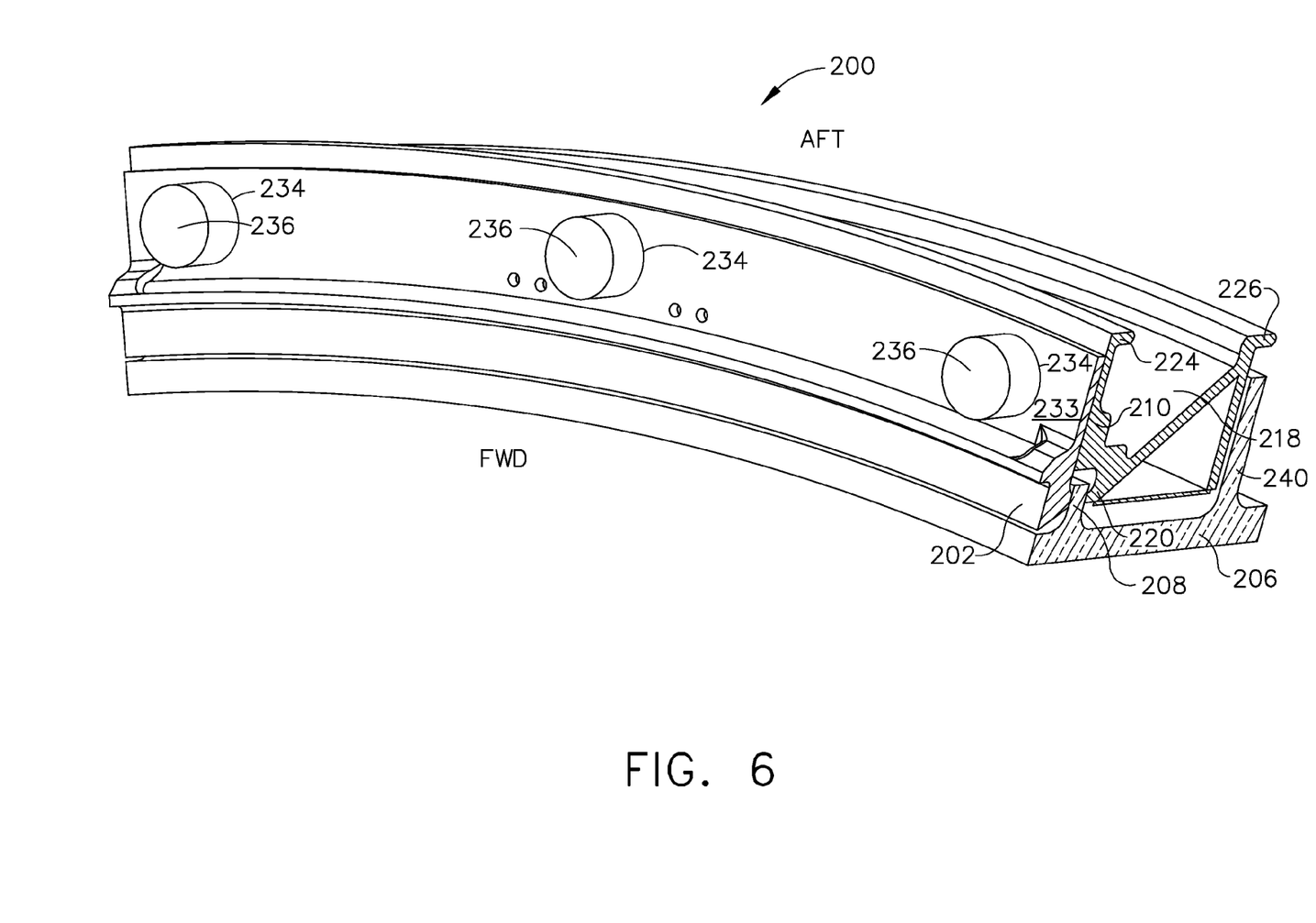
FIG. 6 is a forward perspective view of the shroud hanger assembly looking aft from above.

FIG. 5 is an aft perspective view of shroud hanger assembly 200 looking forward from above. FIG. 6 is a forward perspective view of shroud hanger assembly 200 looking aft from above. In the example embodiment, forward radially extending wall 208 of shroud 206 is shown clamped between radially extending body 233 of forward hanger portion 202 and radially inner end 220 of leg 210.

Figure 7:
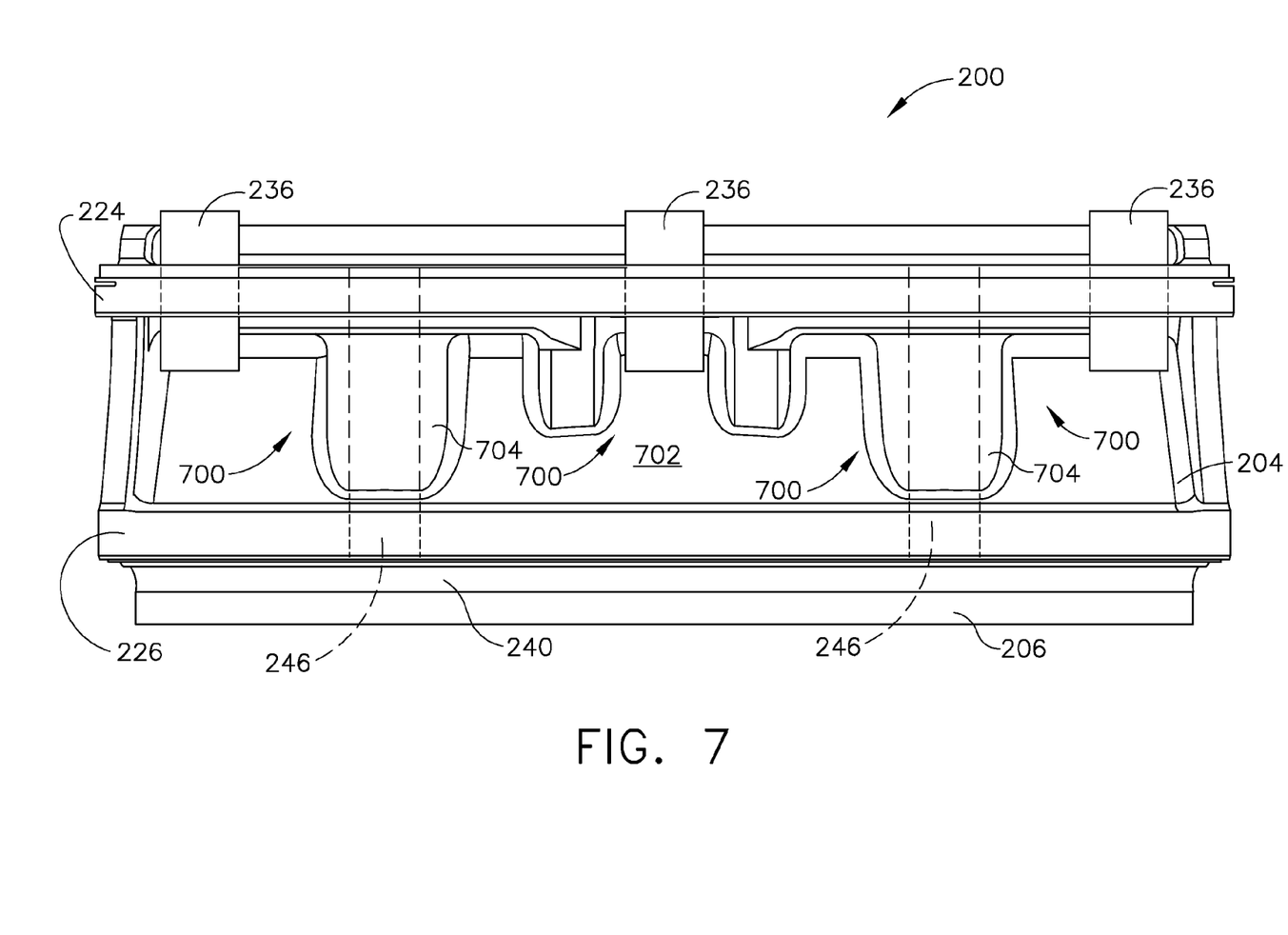
FIG. 7 is a perspective view of the shroud hanger assembly looking radially inwardly.

FIG. 7 is a perspective view of shroud hanger assembly 200 looking radially inwardly. In the example embodiment, includes contours 700 spaced circumferentially along a radially outer surface 702 of aftward hanger portion 204. Contours 700 include a raised area 704 corresponding to each of pins 246. Increased material of each raised area provides space for respective pins which pass through aftward hanger portion 204 in the area of raised area 704.

Depressed areas 706 of surface 702 corresponding to fasteners 236 and in between raised area 704 permit clearance for tooling used to tighten, loosen, or otherwise couple fasteners 236.

It will be appreciated that the above embodiments that have been described in particular detail are merely example or possible embodiments, and that there are many other combinations, additions, or alternatives that may be included.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of transferring load in compression through a diagonal ceramic matrix composite (CMC) web member provides a cost-effective and reliable means for maintaining CMC components in compression during operation and temperature excursions. More specifically, the method and system described herein facilitate coupling a multi-piece hanger assembly to a CMC shroud and transferring a shroud load through the CMC hanger so that the CMC components of the shroud and hanger assembly stay in compression. As a result, the methods and systems described herein facilitate extending a service life of the shroud and hanger assemblies in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud and shroud hanger assembly for a gas turbine engine, said assembly comprising:
    a shroud hanger assembly formed of a first material having a first coefficient of thermal expansion, said shroud hanger assembly having a forward hanger portion and a separate aftward hanger portion, said shroud hanger assembly includes a diagonal web member that extends from a radially inner end of a forward radially extending leg to a radially outer end of an aftward radially extending leg of said aftward hanger portion; and
    a shroud formed of a second material having a second coefficient of thermal expansion, said forward and aftward hanger portions configured to couple together to clamp across a forward radially extending wall of said shroud.

2. The shroud and hanger assembly of claim 1, wherein said forward and aftward hanger portions are configured to couple together using a mechanical fastener connection.

3. The shroud and hanger assembly of claim 1, wherein said forward and aftward hanger portions are configured to couple together using a bolted connection.

4. The shroud and hanger assembly of claim 1, wherein the first coefficient of thermal expansion is equal to the second coefficient of thermal expansion.

5. The shroud and hanger assembly of claim 1, wherein the first and second materials are ceramic matrix composite materials.

6. The shroud and hanger assembly of claim 1, wherein said shroud is supported radially by a pin extending thorough radially outwardly extending walls of said shroud and extending through radially inwardly extending legs of said aftward hanger portion.

7. The shroud and hanger assembly of claim 1, wherein said shroud hanger assembly includes an axial web member extending axially between a forward radially extending leg and an aftward radially extending leg of said aftward hanger portion.

8. The shroud and hanger assembly of claim 1, wherein said aftward hanger portion is supported radially by a first tab extending axially from a radially outer end of a forward leg of said aftward hanger portion and a second tab extending axially from a radially outer end of an aftward leg of said aftward hanger portion, said first and said second tabs configured to engage circumferential lips of a casing surrounding said shroud and hanger assembly.

9. A method of transferring load from a ceramic matrix composite (CMC) shroud to a CMC shroud hanger assembly, said method comprising:
   clamping a forward hanger portion and a separate aftward hanger portion of a shroud hanger assembly together, a forward radially extending wall of the shroud positioned between the forward hanger portion and the aftward hanger portion, the forward radially extending wall receiving a clamping force on a forward side from the forward hanger portion and on an aftward side from the aftward hanger portion providing a load transfer joint between the shroud and the shroud hanger assembly;
   coupling the shroud hanger assembly to a casing of a turbine; and
   transferring load from a nozzle through a diagonal web member of the shroud hanger assembly to the casing.

10. The method of claim 9, wherein clamping a forward hanger portion and a separate aftward hanger portion comprises clamping the forward radially extending wall between the forward hanger portion and the aftward hanger portion at the load transfer joint.

11. A gas turbine engine comprising:
   a shroud hanger assembly formed of a first material having a first coefficient of thermal expansion, said shroud hanger assembly having a forward hanger portion and a separate aftward hanger portion, said shroud hanger assembly includes a diagonal web member that extends from a radially inner end of a forward radially extending leg to a radially outer end of an aftward radially extending leg of said aftward hanger portion; and
   a shroud formed of a second material having a second coefficient of thermal expansion, said forward and aftward hanger portions configured to couple together to clamp across a forward radially extending wall of said shroud.

12. The gas turbine engine of claim 11, wherein said forward and aftward hanger portions are configured to couple together using a mechanical fastener connection.

13. The gas turbine engine of claim 11, wherein said forward and aftward hanger portions are configured to couple together using a bolted connection.

14. The gas turbine engine of claim 11, wherein the first coefficient of thermal expansion is equal to the second coefficient of thermal expansion.

15. The gas turbine engine of claim 11, wherein the first and second materials are ceramic matrix composite materials.

16. The gas turbine engine of claim 11, wherein said shroud is supported radially by a pin extending thorough radially outwardly extending walls of said shroud and extending through radially inwardly extending legs of said aftward hanger portion.

17. The gas turbine engine of claim 11, wherein said shroud hanger assembly includes an axial web member extending axially between a forward radially extending leg and an aftward radially extending leg of said aftward hanger portion.

18. The gas turbine engine of claim 11, wherein said aftward hanger portion is supported radially by a first tab extending axially from a radially outer end of a forward leg of said aftward hanger portion and a second tab extending axially from a radially outer end of an aftward leg of said aftward hanger portion, said first and said second tabs configured to engage circumferential lips of a casing surrounding said shroud and hanger assembly.

* * * * *